United States Patent [19]

Evans, Jr.

[11] 3,820,246

[45] June 28, 1974

[54] MEASURING WHEEL STRUCTURE
[75] Inventor: Wallace D. Evans, Jr., Malibu, Calif.
[73] Assignee: Rolatape Corporation, Santa Monica, Calif.
[22] Filed: Apr. 12, 1973
[21] Appl. No.: 350,366

[52] U.S. Cl. ............................................. 33/141 R
[51] Int. Cl. ........................................... G01b 3/12
[58] Field of Search ............ 33/141 R, 141 E, 141.5

[56] References Cited
UNITED STATES PATENTS
3,191,310  6/1965  Carlson et al. .................... 33/441 E
3,673,693  7/1972  Evans .............................. 33/141 R Primary Examiner—Harry N. Haroian
Attorney, Agent, or Firm—Robert E. Geauque

[57] ABSTRACT

A measuring wheel structure wherein a wheel is employed which has a central aperture, a bifurcated bracket having a pair of spaced apart legs with each leg having an opening therein, the wheel being located between the legs with the central aperture of the wheel being in alignment with the openings in the legs, a sleeve located within the central aperture, the sleeve including knurling thereabout to fixedly secure the wheel to the sleeve, the sleeve including a central interior chamber, a counter mechanism connected to the bracket with the drive shaft of the counter mechanism extending into the interior chamber, a vinyl tube extending around the drive shaft and in contact with the wall of the interior chamber for causing the drive shaft to rotate with the sleeve.

7 Claims, 3 Drawing Figures

PATENTED JUN 28 1974   3,820,246

MEASURING WHEEL STRUCTURE

BACKGROUND OF THE INVENTION

The field of this invention relates to measuring instruments of the wheel type for taking lineal measurements, and in particular relates to novel constructional improvements in a measuring wheel therefor.

It has been common to employ the use of a measuring wheel to measure ground instruments. Primarily, such measuring wheels have been used in agriculture for the determining of acreage by contractors in the laying out of roads and highways. The operator locates the counter mechanism associated with the measuring wheel at zero, and then moves the measuring wheel along the ground from one point to another point. The distance that the wheel is moved is then calculated by the counter mechanism. Normally, the resolution of measurement of the counter mechanism is in feet and inches. However, the resolution may be in yards, tenths of feet, rods or any other measurement.

Initially such measuring wheel devices were designed primarily for use in the outdoor environment. However, it has been common in recent years for a measuring wheel to be used indoors by building contractors, real estate appraisers, insurance agents, police, etc.

Most measuring wheels of the prior art are not constructed in an economical manner. The measuring wheels of the prior art are constructed in a complex manner employing a substantial number of different parts. Also, the normal procedure is to select materials of construction so each of the parts last for several years with a minimum of upkeep and wear. However, such measuring wheels normally encounter a minimum amount of wear during use and frequently the materials used far exceed the conditions encountered over a period of years.

It would be desirable to design a measuring wheel apparatus which is to be constructed of a few number of parts which are formed of inexpensive materials with the apparatus being assembled most economically.

SUMMARY OF THE INVENTION

The measuring wheel structure of this invention is to include a measuring wheel, an associated counter mechanism, and a handle. The handle is connected to the base section of a bifurcated bracket. The measuring wheel is located between the legs of the bifurcated bracket and is rotatably supported therebetween by a sleeve. The wheel is fixedly mounted upon the sleeve through a knurling assembly. The counter mechanism is then mounted within the housing and is fixedly mounted upon an extension of one of the legs of the bifurcated bracket. The drive shaft of the counter mechanism extends within an interior chamber of the sleeve. A vinyl tube surrounds the drive shaft and is in frictional engagement with the wall of the interior chamber. Therefore, the rotational movement of the wheel is transferred to the sleeve and hence to the drive shaft which in turn is transferred to the counter mechanism.

DETAILED DESCRIPTION OF THE SHOWN EMBODIMENT

Figure 1:
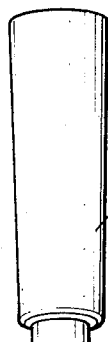
FIG. 1 is a front view of the measuring wheel structure of this invention.
Figure 2:
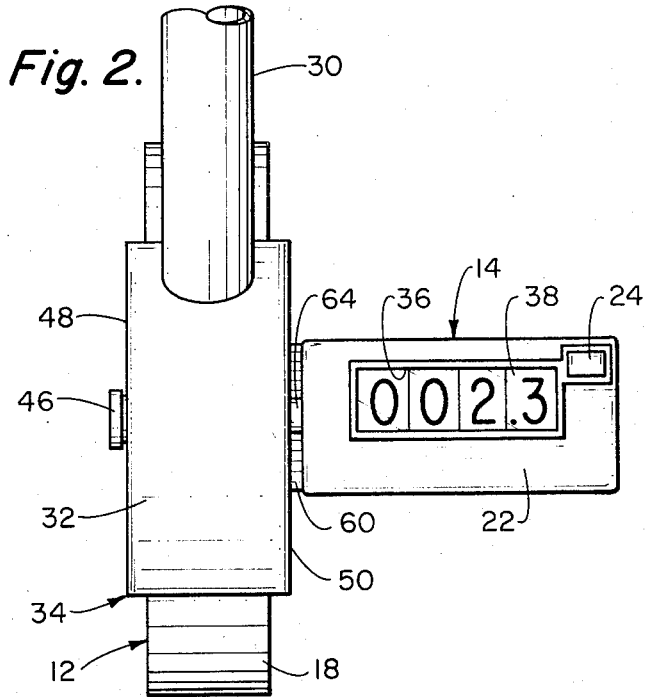
FIG. 2 is a top view of the measuring wheel structure of this invention taken along line 2—2 of FIG. 1.
Figure 3:
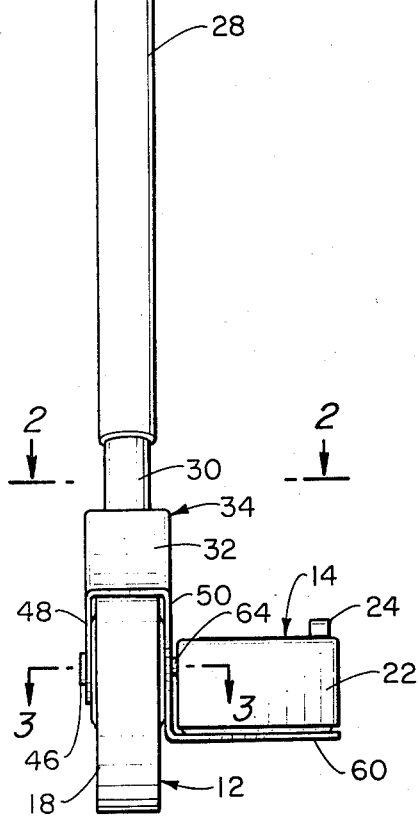
FIG. 3 is a cross-sectional view of the structure of this invention taken along line 3—3 of FIG. 1.
Figure 3:
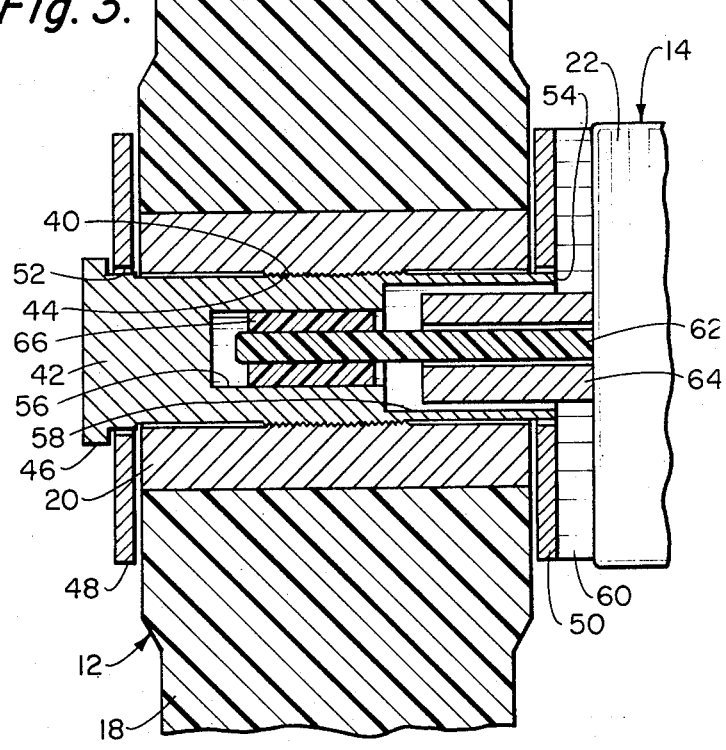

Referring particularly to FIG. 1 of the drawing, there is shown a measuring wheel structure 10 of this invention having a measuring wheel 12, a counter mechanism 14 and a handle 16. The measuring wheel 12 is constructed of an outer hard rubber section 18 which is fixedly attached upon a wheel sleeve 20. The section 18 can be of neoprene rubber or other similar type of material. Neoprene rubber or other similar materials facilitate frictional movement of the measuring wheel 12 along the surface to be measured.

The counter mechanism 14 is located within a housing 22 and forms no specific part of this invention and is deemed to be conventional. Such counter mechanisms are well known and are adapted to count the revolutions of the measuring wheel with respect to the surface being measured. A reset button 24 extends exteriorly of the housing 22 to permit resetting of the counter mechanism to a zero starting position prior to effecting a measurement. An opening 36 is formed within the housing 22 which is to permit observing of the reading upon the counter mechanism 14. A transparent material 38 such as glass or plastic is to close the opening 36.

Handle 16 is composed of a grasping section 26 and rods 28 and 30 which are connected together through a clamp, not shown. The clamp is located interiorly of the rods 28 and 30 and functions to clamp the rods 28 and 30 together when a desired extending of such is achieved. Rod 30 is fixedly secured to the base 32 of bifurcated bracket 34. It is to be noted that the rod 30 is connected at one end of the base 32 with such being desired so that the counter mechanism can be easily observed during use of the structure.

Interiorly formed within the sleeve 20 is a first knurling section 40. Formed about a sleeve 42 is a second knurling section 44. One end of the sleeve 42 includes an enlarged head 46. Bifurcated bracket 34 includes a pair of spaced apart legs 48 and 50. The leg 48 includes an opening 52 therein with leg 50 including an opening 54 therein. Openings 52 and 54 are located in substantial alignment with each other with the sleeve 42 being adapted to be located therethrough. In order to facilitate the insertion of the sleeve 42 therethrough, opening 52 is of a slightly larger diameter than opening 54. This permits passage of the knurled section 44 so that the sleeve 42 can be fully inserted with the head 46 being located directly adjacent the leg 48. With the sleeve 42 fully inserted, the knurled area 44 is in frictional contact with the knurled area 40 with the result that the measuring wheel 12 is fixedly mounted upon the sleeve 42.

Located within the sleeve 42 is an inner interior chamber 56 and an outer interior chamber 58. The housing 22 of the counter mechanism is fixedly mounted by fastening means to extension 60 which is integrally connected and extending at a right angle from leg 50. The counter mechanism drive shaft 62 extends exteriorly of the housing 22 and it passes through chamber 58 and terminates within chamber 56. A protective sleeve 64 is connected to the housing 22 and extends about drive shaft 62 and is approximately half the length of the drive shaft 62. The sleeve 64 extends within the outer interior chamber 58.

A vinyl plastic tube 66 is mounted upon the end of the drive shaft 62. The circumferential area of the tubing 66 is to be in frictional engagement with the wall of the interior chamber 56. As a result, as the sleeve 42 rotates, so does the drive shaft 62.

The operation of the structure 10 of this invention is as follows: It is assumed that the handle 16 is in the compact position. The operator then merely releases the clamp, not shown, and effects extension of the handle 16 to the desired length and then retightens the clamp. The operator then actuates the reset button 24 to set the counter mechanism 14 at zero. The operator then proceeds to the starting point and begins moving the outer circumference of the section 18 of the measuring wheel 12 upon the surface to be measured between the desired two points on the surface. It is not necessary for the operator to effect walking as the structure 10 of this invention may be employed to measure the height of vertical walls or other similar vertical or substantially vertical structures. Upon the operator reaching the desired distance on the surface to be measured, the operator only needs to effect reading of the counter mechanism 14, thereby denoting an accurate measurement of the desired distance between the points.

As the measuring wheel 12 is rotated, this rotational movement is transferred through sleeve 20 to the sleeve 42 through the knurling arrangement 40 and 44. The sleeve 42 rotates within the openings 52 and 54. The rotational movement of the sleeve 42 is transferred through the tubing 66 to the drive shaft 62. The rotation of the drive shaft 62 causes operation of the counter mechanism 14.

What is claimed is:

1. A measuring wheel structure comprising:

a wheel having a central aperture;

a bifurcated bracket having a pair of spaced apart legs, a first opening in one of said legs and a second opening in the other of said legs, said first and second openings being in alignment with each other, said wheel located between said legs with said central aperture being in alignment with said first and second openings;

a sleeve located within said central aperture, a first means located between said sleeve and said wheel for fixedly connecting said wheel to said sleeve, said sleeve having a central interior chamber, said sleeve being conducted through said first and second openings with said bracket being rotatable on said sleeve; and a counter mechanism located in a housing, said housing fixed to said bracket, said counter mechanism having a drive shaft, said dirve shaft extending within said interior chamber, second means connecting said sleeve and said drive shaft for causing said drive shaft to rotate with said sleeve.

2. The structure as defined in claim 1 wherein:

said second means comprising a resilient nonmetallic material.

3. The structure as defined in claim 2 wherein:

said second means comprises a vinyl tube extending about said drive shaft and in contact with the wall of said interior chamber.

4. The structure as defined in claim 1 wherein:

one of said legs of said bracket having an extension extending from said leg at approximately ninety degrees, said counter mechanism being fixedly mounted upon said extension.

5. The structure as defined in claim 1 wherein:

said first opening being of a larger size than said second opening.

6. The structure as defined in claim 1 wherein:

said first means includes a raised area upon said sleeve, said raised area being knurled.

7. The structure as defined in claim 6 wherein:

said first opening being larger than said second opening, said first opening to be substantially equal to or greater than the cross-sectional area of said raised area, said second opening being at least equal in size to the cross-sectional area of said sleeve.

* * * * *